Sept. 1, 1953     D. L. KELLEMS     2,650,400
INTERWOVEN MESH TYPE CABLE GRIP
Filed Feb. 1, 1950     2 Sheets-Sheet 1
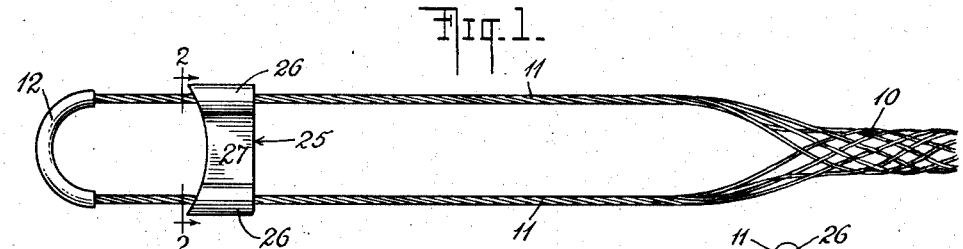
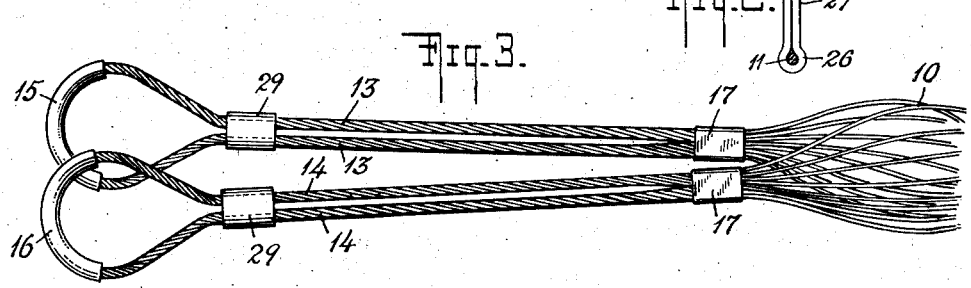
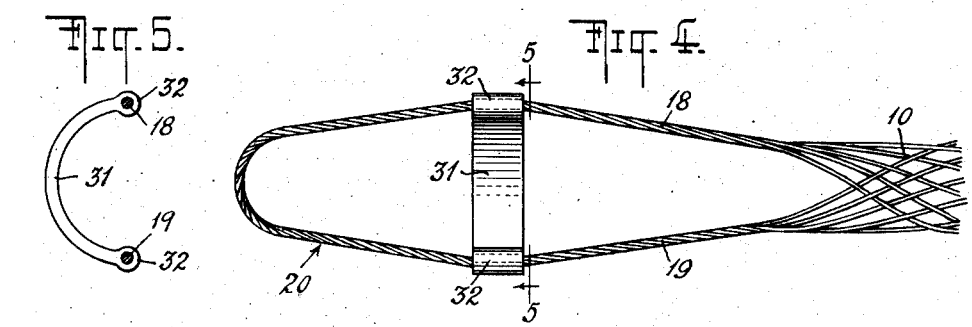
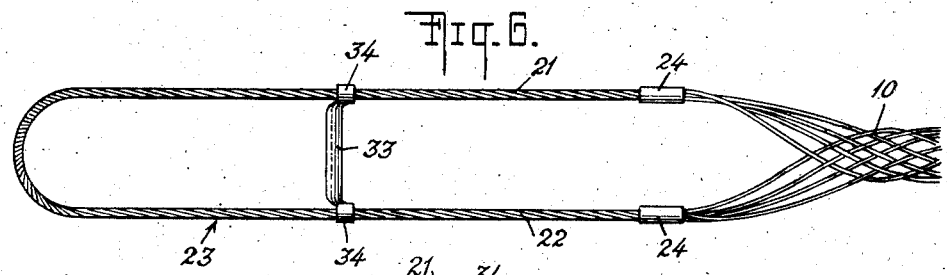
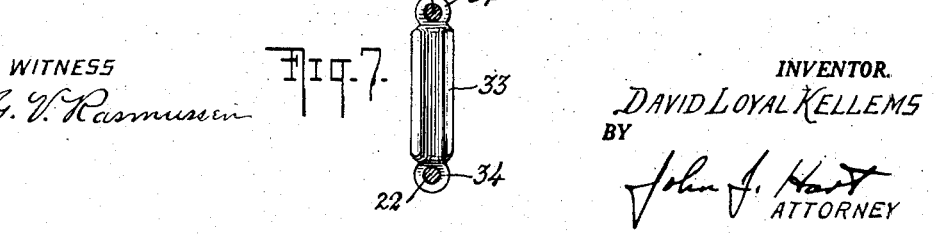
WITNESS
G. V. Rasmussen
INVENTOR.
DAVID LOYAL KELLEMS
BY
John J. Hart
ATTORNEY

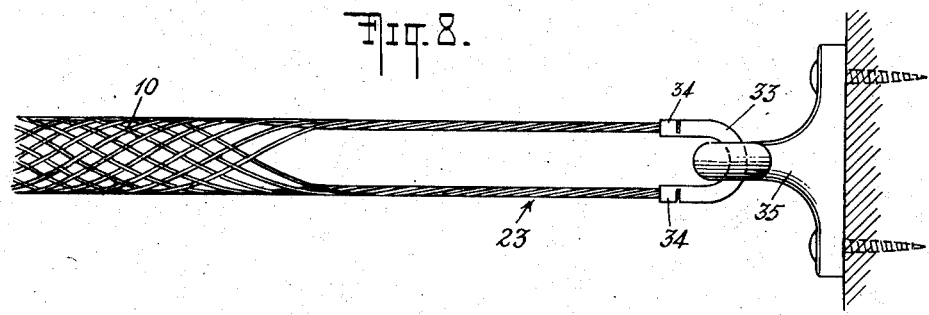
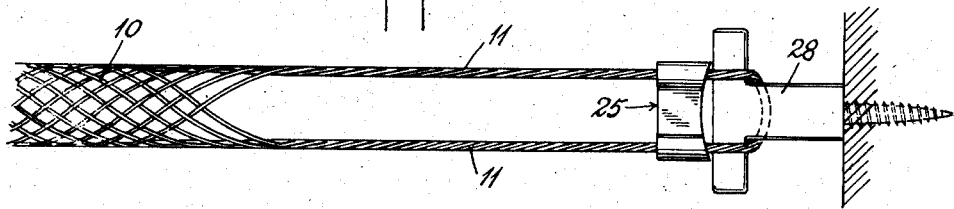
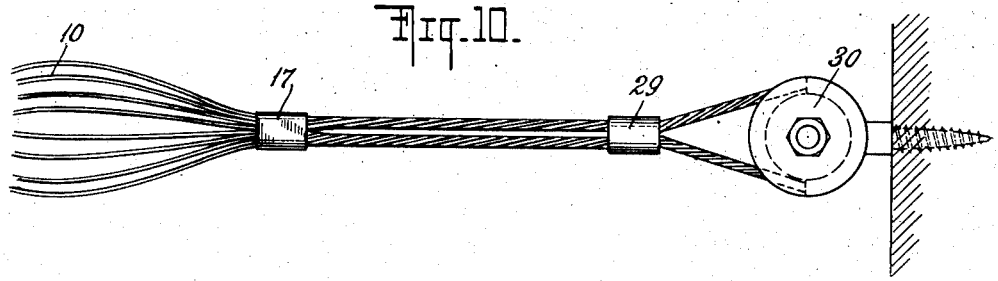
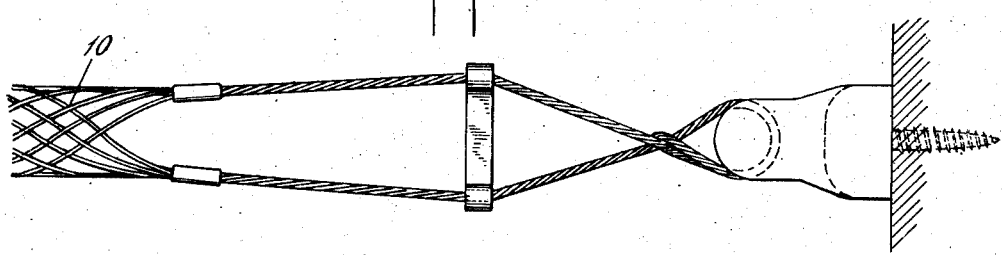

Patented Sept. 1, 1953

2,650,400

UNITED STATES PATENT OFFICE 2,650,400

INTERWOVEN MESH TYPE CABLE GRIP

David Loyal Kellems, Mystic, Conn., assignor to Kellems Company, Stonington, Conn., a partnership Application February 1, 1950, Serial No. 141,673

12 Claims. (Cl. 24—123)

1

This invention relates to braided, open mesh, wire cable grips and more particularly to the end loops of such devices, whereby a grip with an article gripped therein, may be attached to a supporting means such as an insulator, hook and the like.

When fastening a cable grip with a cable or other article gripped therein to an insulator or other supporting means, it sometimes is advantageous to lock the end loop or eye on the grip to the insulator or other supporting means, so that it will not become loose from such means. Also, and more importantly, when fastening to a supporting means such as an insulator, a cable grip provided with a single end loop or eye, it is sometimes necessary to tie the grip to the insulator by looping the grip through the eye. When so mounted upon an insulator, the strands or branches of the eye will be squeezed together, thus causing a choking or constriction of the space between the branches which may cause injury to the cable or article supported by the grip.

One of the objects of the present invention is to provide means on the eye or eyes of a cable grip for controlling the separate strands or branches of such eye or eyes.

Another object of the invention is to provide means on the eye or eyes of a cable grip for controlling the spacing of the separate strands or branches of such eye or eyes while an article is being inserted into the grip and during the time that the grip with the article gripped therein is mounted upon a supporting means.

A further object of the invention is to provide on a braided open mesh cable grip a slidable spacing for controlling the separate strands or branches of the eye or eyes of such grip.

A still further object of the invention is to provide in a woven grip, a spacer or spacers whereby the strands or branches of the eye or eyes of such grip may be held apart sufficiently to permit the free bending of a cable supported by such grip.

Other objects of the invention, as well as the advantages thereof, will become apparent after a perusal of the following description when read in connection with the accompanying drawings in which Fig. 1 is a side elevation of the draft or upper end of a grip constructed in accordance with the invention; Fig. 2 is a vertical sectional view taken along the line 2—2 of Fig. 1; Fig. 3 is a view similar to Fig. 1 and showing the draft or upper end of a grip constructed in accordance with the invention, but provided with

2 two end loops or eyes; Fig. 4 is a side elevational view of the draft or upper end of a grip showing a modified form of the slidable bar; Fig. 5 is a vertical sectional view taken along the line 5—5 of Fig. 4; Fig. 6 is a side elevational view of the draft or upper end of a grip showing a still further form in which the slidable bar may be made; Fig. 7 is a side view of the sliding bar shown in Fig. 6, the view being taken from the left to Fig. 6; Fig. 8 is a side elevational view showing one manner in which the grip of Fig. 6 may be mounted on a supporting means; Fig. 9 is a similar view showing the grip of Fig. 1 mounted on a special type of hook; Fig. 10 is a similar view showing the grip of Fig. 3 fastened to insulators, and Fig. 11 is a similar view showing one manner in which grips of the type shown in Figs. 4 and 6 may be secured to an insulator.

In the drawings, the reference numeral 10 indicates generally the body of the grip in all of the several modifications of my invention. The body 10 of the grip is composed of a plurality of wire strands interlaced or interwoven to form an open mesh structure adapted to be placed in surrounding gripping relation with an article and having any suitable form. Some examples of the forms in which the grip body 10 may be made are illustrated in the E. E. Kellems Patent No. 2,017,625, issued October 15, 1935. The strands of the grip body 10 extend some distance beyond the draft end thereof and may be divided into two or more groups or branches to form one or two looped ends or eyes. In Fig. 1 of the drawings, the strands extending from the draft end of the grip body 10 are shown divided to form a pair of branches 11, each containing a like number of strands which are preferably twisted upon each other into rope form. The outer ends of the strands of each branch 11 are inserted in opposite ends of a U-shaped metal tube 12, preferably from end to end thereof so that the ends of the branches 11, 11 overlap within the tube. The metal tube 12 is tightly compressed upon the overlapping ends of the branches 11, 11, thereby forming the branches 11, 11 into an open-shaped loop or eye.

In the construction shown in Fig. 2 of the drawings, the end extensions of the strands at the draft end of the grip body 10 are divided into four branches instead of two branches, as shown in Figure 1. In this construction, the strands are divided first into two groups of an equal number of strands and then each group is formed into two branches 13, 13 and 14, 14.

The strands in the branches of each group are twisted upon each other into rope form and the branches of each group are overlapped and secured together in the manner previously described with respect to the branches 11, 11 in the construction shown in Fig. 1 of the drawings. In other words, the branches 13, 13 are secured at their ends by a U-shaped metal tube 15 to form one loop or eye and the branches 14, 14 are secured together at their ends by a second U-shaped metal tube 16 to form a second loop or eye. The strands of each group adjacent to the grip body 10 and at the point that each group is formed into two branches, are preferably bound together by tubular metal ferrules 17, 17 which are tightly compressed upon the strands to firmly hold them in relatively small, compact space.

The end extensions of the strands at the draft end of the grip body 10 may also be divided into two branches 18 and 19, each of which extends for some distance beyond the grip body and is then returned along the other branch to form an open loop shaped eye 20, as is shown in Fig. 4 of the drawings. A somewhat similar construction of eye is shown in Fig. 6 of the drawings, but in this latter figure the lengths of the end extensions of the strands are such that the branches 21 and 22 formed therefrom provide a relatively long, very flexible loop 23. In these constructions the return ends of the strands may be interwoven or intertwined in either the branches or the grip body, as indicated in Fig. 4 of the drawings, or firmly clamped in position by ferrules 24, 24 similar to those previously described as shown in Fig. 6 of the drawings.

It will be understood from the foregoing, that in the practice of this invention, the grips may be provided with end loops or eyes of any desirable construction, may be secured to the grip body 10 in any suitable fashion and may be of a length most suited for the purposes for which the grip is to be used.

The single eye grip shown in Fig. 1 of the drawings is provided with a member, generally designated 25, and constituted of a tubular piece of semi-rigid material such as copper. As will be seen from Figs. 1 and 2 of the drawings, the tubular piece has been formed to provide two tubular end sections 26, 26 and a straight, two layer section 27. The end sections 26, 26 have an interior diameter slightly greater than the exterior diameter of the branches 11, 11 which extend therethrough so that the member 25 is readily slidable on such branches when it is not secured to the later and so that the end sections 26, 26 of such member may be readily and securely fastened to such branches by clinching them to the latter. The intermediate straight section or spacer 27 may or may not be greater in length than the diameter of the grip body 10, but is preferably greater in length than the diameter of such grip body so that the openings in the end sections 26, 26 are spaced apart a distance substantially greater than the diameter of the grip body (note Fig. 4). This latter construction will cause the branches 11, 11 of the eye to approach the article held in the grip body, for example, a cable, at an angle, thereby minimizing cutting action of the eye at the points where the wires of the grip body 10 converge into the branches 11, 11 of the eye. It will be noted that while the member 25 is made of a relatively soft metal, such as copper, the manner in which it is formed gives it great strength and rigidity and assures that the intermediate section 27 thereof will maintain the end sections 26, 26 thereof in properly spaced relation, even under relatively heavy forces exerted on the branches 11, 11 of the grip. The member 25 may be made from a tubular piece of equal width throughout, but may have any shape suitable for which the grip is to be used. For example, if the grip is to be secured to an insulator, it is desirable that that end of the member 25 adjacent to the end of the eye be arcuately shaped as is shown in Fig. 1 of the drawings, so as to substantially conform to the shape of a portion of the insulator groove in which the grip is hung.

It will be understood from the foregoing, that in the use of the grip shown in Fig. 1 of the drawings, the member 25 is normally freely slidable along the lengths of the branches 11, 11 thereof. When the grip with an article gripped therein is mounted on a supporting means, such as an insulator or a hook, such as the hook 28 shown in Fig. 9 of the drawings, the member 25 is moved into position adjacent to such supporting means and then the end members 26, 26 are clinched so that they become securely fastened to the branches 11, 11 of the grip. Thus the grip is securely fastened to the supporting means and cannot become inadvertently loosened from its attachment to such supporting means. The member 25 when thus secured will also act to maintain the eye open, thereby distributing the strains exerted on the grip equally upon the strands throughout the area of the grip body 10, affording a more positive and firmer grip of the grip body 10 upon the cable or other article gripped thereby, and minimizing any cutting action of the strands at the draft end of the grip body 10 on the article being gripped. In this latter connection, such cutting action is substantially eliminated if the member 25 is constructed to maintain the branches 11, 11 in diverging relation relative to the grip body 10, as has been explained.

In the grip shown in Fig. 3 of the drawings, the clinching device, instead of being made of one piece of material to provide two tubular clinching members integrally formed with a spacer, as in the device 25 shown in Fig. 1 of the drawings, is formed of two metal tubes 29, 29, each of which is mounted on both branches of one of the eyes. Each of the tubes 29 has a cross-sectional area preferably oval in form and greater than the combined cross-sectional area of the two branches on which it is mounted so that such tube is readily slidable on the branches of its associated eye intermediate the outer end of the latter and the grip body 10. The tubes 29 may be made of copper or any other suitable metal material and like the end sections 26, 26 of the device 25 are clinched to the branches to secure the grip in position upon a supporting means, such as the double insulator support shown in Fig. 10 of the drawings. While the clinching device previously described may be used satisfactorily on the eyes of the grip in Fig. 10 with each end section 26 slidably mounted on both branches of each eye, it is not necessary that the spacing portion 27 of such device be used on a grip such as shown in Fig. 3, because the article being gripped, such as a cable does not emerge out of the draft end of the grip body 10 between the branches of a single eye, but comes out between the two eyes. The spacer 27 may therefore be eliminated and two separate tubular clinching members, such as the members 29, 29, may be used to equal advantage in accomplishing the purposes of the invention.

The clinching device shown in Figs. 4 and 5 of the drawings is substantially similar in construction to the device 25 previously described except that the spacing bar 31 connecting the two end tubular sections 32, 32 is arcuately-shaped (note Fig. 5). This construction is of especial advantage in that it enables the clinching device to be positioned at any point along the length of the eye when the grip body 10 is gripping a cable and preferably closely adjacent to the draft end of such body where the wire strands thereof converge into the two branches 21, 22, during the mounting of the grip on the cable. This construction of clinching device also enables the eye of the grip to be made substantially shorter in length than a grip with a device 25 (compare Figs. 1 and 4 of the drawings), because the spacing bar 31 will not interfere with or block the ready threading of a cable through the grip body. While in this construction the distance between the holes or openings in the end sections 32, 32 may or may not be greater than the diameter of the grip body 10, it is preferable, particularly in the case of a short eye, that such spacing of the holes or openings in the sections 32, 32 be substantially greater than the diameter of the grip body as shown in Fig. 4 in order to space the branches 18 and 19 apart so that they approach the grip body at an angle to attain the advantage hereinabove mentioned. As is shown in Fig. 5 of the drawings, this clinching device, instead of being formed from a metal tube as the device 25, may be formed from a narrow metal plate whose ends have been drilled or otherwise processed to form the tubular sections 32, 32. It will be understood that such plate may be of equal thickness throughout, or of different thicknesses, and that the clinching device 25 may be similarly formed.

In the embodiment shown in Figs. 6 and 7 of the drawings, the clinching device is shown as having a channel-shaped intermediate section 33 and tubular end sections 34, 34 which are disposed transversely to the intermediate section 33. This device may be formed in any suitable manner, as by taking a section of tubing made of semi-rigid metal material, such as copper, and having a diameter only slightly greater than the diameter of the branches of the grip on which it is to be mounted, cutting such tubing part way through adjacent its ends to form the tubular sections 34, 34, then bending such tube sections 34, 34 about the hinge portions of metal left by such cutting operation, and then by a dieing operation forming the tubular intermediate section into a channel shape. When mounted on the eye of a grip, the channel of such intermediate section 33 is in opposed relation to the outer end of the grip eye 23 as is shown in Fig. 6 of the drawings. It will be readily understood that this clinching device may be used in the same manner to obtain the same advantages as hereinabove described with respect to the clinching devices shown in Figs. 1 and 4. In addition, it may be used as a protecting sleeve for the eye where the clinching or separating action is not required. This use of the clinching device of Fig. 6 and 7 is illustrated in Fig. 8 of the drawings. In such case, it will be noted that the metal hinges connecting the end tube sections 34, 34 with the intermediate section 33 are bent to bring the openings of such end sections into alignment with the adjacent ends of the channel in said intermediate section and such intermediate section is bent into a U-shape, the outer end of the eye 23 being positioned in such U-shaped groove of the intermediate section. It will thus be seen that the intermediate section 33 will be positioned between the end of eye 23 and the hook 35 on which the grip is supported, thereby becoming in effect a protecting sheath for the end of the eye against any possible damage thereto by the hook 35 during usage.

It will be noted in Fig. 6 of the drawings, that the branches 21, 22 of eye 23 of the grip are relatively long and flexible so that the end of the eye may be readily threaded through openings such as are encountered in some forms of insulators and then the grip secured or tied to the insulator by inserting the grip through the portions of the eye that has been inserted through the hole in the insulator, as is shown in Fig. 11 of the drawings. This tying of the eye to the insulator is of course accomplished when the clinching device is positioned on the branches 21, 22 of the eye adjacent to the draft end of the grip body 10. After the grip has been tied to the insulator, the clinching device is moved outwardly as far as possible on the branches 21, 22 and then the sections 34, 34 of such device are clinched to the branches 21, 22. The clinching device in this use of the grip therefore not only locks the knot made in the eye, but also maintains the branches 21, 22 in spaced apart condition to permit a free bending of the cable and to prevent any possible injury to the cable through the grip. The clinching device shown in Figs. 6 and 7 of the drawings, can thus be used in three forms of application, namely, tying the grip to a supporting means and using the slidable or clinching device as a spacer for the branches of the eye as shown in Fig. 11 of the drawings, using the slidable device as a locking device to secure the grip to the supporting means as indicated in Fig. 9 of the drawings, and using the slidable or clinching device as a protector for the strands of the eye, as is shown in Fig. 8 of the drawings. In this connection, it is also pointed out that the slidable or clinching devices shown in Figs. 1 and 4 of the drawings when mounted on a grip having an elongated, flexible eye such as shown in Fig. 6 of the drawings, may also be used in the manner shown in Fig. 11 of the drawings to maintain the branches of the tied eye in spaced relation.

While I have illustrated and hereinabove described preferred embodiments of my invention, it will be apparent to those skilled in the art that other changes and modifications may be made therein without departing from the spirit of the invention or the scope of the appended claims.

I claim:

1. In a gripping device of the character described, a plurality of wire strands interwoven to form an open mesh body portion adapted to be placed in surrounding gripping relation with an article, said body portion having extension strands at one end thereof divided into spaced groups to form a flexible, elongated draft loop of predetermined size and providing a complete means for attaching said mesh body with an article gripped thereby to a holding device and for supporting the same on the latter, and a cinching member bridging the branches of said draft loop and slidably mounted on both of said branches intermediate the outer end of such loop and said body portion, said cinching member comprising a pair of tube-like portions each slidably mounted on a branch of said draft loop and an intermediate bridge part supporting said tube-like portions in spaced relation, said cinching member being adjustable outwardly on said branches to provide an outer, reduced, draft loop portion by which the device may be secured to a holding device and to hold the portions of the branches between the tube-like portions of said member and said body portion in such spaced relation as to provide an opening in said draft loop between said member and said body portion through which the article being gripped may extend, said tube-like portions being composed of a material as to enable such portions to be adjustably clinched in position on said branches to fix the size of said outer, reduced draft loop portion and the opening formed by said clinching member, branch portions and body portion, and said bridge part having sufficient rigidity to enable said member to maintain said draft loop branches in spaced relation under the applied forces and being of such length that the branch portions of the draft loop between said member and said body portion are maintained in such spaced relation as to distribute the strains exerted on the gripping device equally upon the strands throughout the area of the grip body.

2. A gripping device such as defined in claim 1 in which said bridge part has a shape such that no portion thereof extends across a projection of the interior configuration of said body portion on an article.

3. A gripping device such as defined in claim 1 in which said bridge part is arc-shaped.

4. In a gripping device of the character described, a plurality of wire strands interwoven to form an open mesh body portion adapted to be placed in surrounding gripping relation with an article, said body portion having extension strands at one end thereof divided into spaced groups to form a flexible, elongated draft loop of predetermined size and providing a complete means for attaching said mesh body with an article gripped thereby to a holding device and for supporting the same on the latter, and a cinching member bridging the branches of said draft loop and slidably mounted on both of said branches intermediate the outer end of such loop and said body portion, said cinching member comprising a pair of tube-like portions each slidably mounted on a branch of said draft loop and an intermediate bridge part supporting said tube-like portions in spaced relation, said cinching member being adjustable outwardly on said branches to provide an outer, reduced, draft loop portion by which the device may be secured to a holding device and to hold the portions of the branches between the tube-like portions of said member and said body portion in such spaced relation as to provide an opening in said draft loop between said member and said body portion through which the article being gripped may extend, said tube-like portions being composed of a material as to enable such portions to be adjustably clinched in position on said branches to fix the size of said outer, reduced draft loop portion and the opening formed by said clinching member, branch portions and body portion.

5. A gripping device such as defined in claim 4 in which said bridge part has an outer edge conforming in configuration to a portion of a supporting means on which said gripping device may be mounted.

6. A gripping device such as defined in claim 4 in which said bridge part is made of a bendable material capable of being bent into a shape substantially conforming to the outer end of said draft loop.

7. A gripping device such as defined in claim 4 in which said bridge part is provided on its outer side with a channel adapted to receive the outer end of said draft loop and is made of a bendable material capable of being bent into a U-shaped form with the channel on the periphery of such U-shaped form.

8. A gripping device such as defined in claim 4 in which said bridge part is made of bendable material capable of being bent into U-shaped form and in which said bridge part is hingedly connected to said tube-like portions.

9. A gripping device such as defined in claim 4 in which said transverse member has a length such as to maintain said tube-like portions apart a distance greater than the length of the interior diameter of said body portion when in gripping relation on an article.

10. A gripping device such as defined in claim 4 in which said bridge part is made of metal material capable of being bent into a U-shaped form and said tube-like portions are connected to be movable relative to said bridge part.

11. In a gripping device of the character described, a plurality of wire strands interwoven to form an open mesh body portion adapted to be placed in surrounding gripping relation with an article, said body portion having extension strands at an end thereof divided into groups to form a flexible elongated draft loop of predetermined size and providing a complete means for attaching said mesh body with an article gripped thereby to a holding device and for supporting the same on the latter, and a cinching member bridging the branches of said draft loop and slidably mounted on both of said branches intermediate the outer end of such loop and said body portion, said cinching member comprising a pair of outer portions each slidably mounted on a branch of said draft loop and an intermediate bridge part supporting said outer portions in spaced relation, said cinching member being adjustable outwardly on said branches to provide an outer reduced opening in the draft loop through which the holding device extends and to hold the portions of the branches between said member and said body portion in such spaced relation as to provide an opening in said loop in back of said member through which the article being gripped may extend, said outer portions being composed of a material as to enable the same to be adjustably clinched in position on said branches to fix the sizes of said inner and outer loops formed by said member and the draft loop.

12. In a gripping device of the character described, a plurality of wire strands interwoven to form an open mesh body portion adapted to be placed in surrounding gripping relation with an article, a draft loop composed of two branches connected at their inner ends to diametrically opposed places at one end of said body portion and having such length and flexibleness as to enable a tie knot to be formed therewith to secure it to a holding device, said draft loop providing a complete means for attaching the mesh body with an article gripped thereby to the holding device and for supporting the same on the latter, and a cinching member bridging the branches of said draft loop and slidably mounted on both of said branches intermediate the outer end of such loop and said body portion, said cinching member comprising a pair of outer portions each slidably mounted on a branch of said draft loop, and an intermediate bridge part supporting said outer portions in spaced relation, said cinching member being adjustable outwardly on said branches to lock the tie knot by which the device may be secured to a holding device and to hold the portions of the branches between said member and said body portion in such spaced relation as to provide an opening in said draft loop between said member and said body portion through which the article being gripped may extend, said outer portions being composed of a material as to enable such portions to be adjustably clinched securely in position on said branches to lock the tie knot and to fix the size of the opening in the draft loop in back of said member, and said bridge part being of such rigidity and having such length as to maintain said branch portions in such spaced relation as to distribute the strains exerted on the gripping device equally upon the strands throughout the area of the grip body.

DAVID LOYAL KELLEMS.

References Cited in the file of this patent

UNITED STATES PATENTS

| Number | Name | Date |
|---|---|---|
| 502,962 | Green | Aug. 8, 1893 |
| 521,018 | De Mott | June 5, 1894 |
| 549,192 | Garbesi | Nov. 5, 1895 |
| 646,091 | Hammond | Mar. 27, 1900 |
| 1,114,637 | Nolan | Oct. 20, 1914 |
| 1,206,008 | McCable | Nov. 28, 1916 |
| 1,348,045 | Peralta | July 27, 1920 |
| 2,017,625 | Kellems | Oct. 15, 1935 |
| 2,112,281 | Ferris | Mar. 29, 1938 |
| 2,307,216 | Graham | Jan. 5, 1943 |
| 2,327,683 | Warner | Aug. 24, 1943 |
| 2,342,244 | Brooks | Feb. 22, 1944 |

FOREIGN PATENTS

| Number | Country | Date |
|---|---|---|
| 282,192 | Italy | Feb. 4, 1931 |
| 48,396 | Denmark | Feb. 19, 1934 |